United States Patent [19]
Mohmand

[11] Patent Number: 5,486,897
[45] Date of Patent: Jan. 23, 1996

[54] DECORATIVE CARDS

[76] Inventor: Shakar Z. Mohmand, P.O. Box 49503, Omariya, Kuwait

[21] Appl. No.: 97,928

[22] Filed: Jul. 28, 1993

Related U.S. Application Data

[63] Continuation of Ser. No. 751,666, Aug. 23, 1991, abandoned, which is a continuation of Ser. No. 576,138, Aug. 24, 1990, abandoned, which is a continuation of Ser. No. 356,530, May 24, 1989, abandoned.

[30] Foreign Application Priority Data

May 27, 1988 [GB] United Kingdom .................. 8812622

[51] Int. Cl.$^6$ .................................................. G03B 27/02
[52] U.S. Cl. ................................................................ 355/132
[58] Field of Search ..................... 355/132, 122, 355/123, 54, 99, 77, 40 FP, 53, 93; 40/364, 365, 366, 263, 204, 205

[56] References Cited

U.S. PATENT DOCUMENTS

| | | | |
|---|---|---|---|
| 3,094,034 | 6/1963 | Eagle et al. | 156/353 |
| 3,792,542 | 2/1974 | Cohan | 355/40 FP |
| 3,869,201 | 3/1975 | Lysle | 353/120 |
| 4,003,779 | 1/1977 | Griswold et al. | 156/353 |
| 4,094,596 | 6/1978 | Waly | 353/120 X |
| 4,515,451 | 5/1985 | Benham, Jr. et al. | 353/120 |

*Primary Examiner*—Khanh Dang
*Attorney, Agent, or Firm*—Bacon & Thomas

[57] ABSTRACT

A decorative card is produced by duplicating a microfiche on which is provided a suitable pattern, the light sensitive side of the fiche being subsequently provided with a protective layer. In producing frames of aligned characters to form the card, a master guide strip may be provided to be used in conjunction with a strip secured to a character for use in individual frames as required.

11 Claims, 1 Drawing Sheet

DECORATIVE CARDS

This application is a Continuation of application Ser. No. 07/751,666, filed Aug. 23, 1991, abandoned, which is a continuation of 07/576,138, filed Aug. 24, 1990 abandoned, which is a continuation of 07/356,530, filed May 24, 1989 abandoned.

This invention relates primarily to the production of decorative cards, sheets and the like, carrying e.g. pictures, decoration, written matter and so forth. The invention is particularly, but not exclusively, concerned with the production of decorative cards for use as greeting cards. The particular system described in detail is mainly for use in low volume situations but many aspects are capable of being mechanised for use in higer volume production. This invention is particularly concerned with the use of microfiches.

The essence of the invention is the transfer to one side of a clear flexible plastic sheet, of an image to be viewed from the other side, particularly by a microfiche technique, and then the appliction to said one side of a protective layer to prevent erosion of the image. This protective layer could be in the form of a film sprayed onto the sheet but is preferably a layer of flexible plastic stuck onto the sheet. Self-adhesive plastic is particularly suitable for this purpose and may have a decorative outer surface to enhance the appearance of the card.

To prevent damage to the edge of the card, suitable edging means may be provided such as clear adhesive tape.

The end result is a strong durable card, which is flexible for ease of handling and in which the image is protected.

The image may be initially transferred only as a monochrome image, e.g. black. This can be done by a printing process or by an electrostatic copying process but preferably is done by a photographic process. In particular, the invention has been developed for use with microfiche technology. There exists apparatus for duplicating microfiches and thus by copying a suitable image using such apparatus, a sheet of fiche material will be provided with an image on the side having the light sensitve layer of material.

The original to be duplicated could itself be a fiche. In such a case, to obtain a suitable image it would be possible to use the method disclosed below which enables macro-sized images to be obtained on a fiche. If desired, this could be used only to provide e.g. a decorative border or the like.

In one preferred system, the image is a sheet of another type of material used in producing transparencies in microfilm techniques, e.g. for the purpose of making titles. In such a system, a black on white image is passed through a machine and a corresponding sheet of black material with the image clear is then produced. This can then be put into the fiche duplicating apparatus.

As mentioned above, an electrostatic copying process could be used to transfer an image from an original drawing to a transparent sheet of e.g. plastic to be used in the fiche duplicating machine. Photocopying or laser printing may be used.

If desired, black lines can be put on any clear areas—e.g. to produce detail—manually using a conventional marker pen or the like.

In the fiche to be used, or other sheet with the image, the use of black and clear areas will be as desired for a chosen artistic effect. A particular item, such as a flower, could be essentially clear and surrounded by black, or black on a clear background. The black for the item could be solid, or it could be drawn with lines.

The clear areas may be coloured, on the side of the sheet which is to be provided with the protective layer. This can be done by any suitable method, such as the use of coloured paper or plastic to be bonded between the two layers, paint or dye, and even colouring the protective layer itself. The entire clear area on the sheet may be dyed a particular colour. For example, by boiling a fiche in an aqueous solution of a suitable dyeing material, various effects can be achieved.

The preferred system involves such a process of dyeing—since it facilitates bonding of the layers by avoiding intermediate sheets—together with hand painting of selected areas. The painting can involve the use of conventional paints, nail varnishes and so forth.

As noted above, the original to be copied by the photographic process—ie. by duplicating a microfichem, could itself be a microfiche.

A mircofiche is a sheet of film on which a number of frames are provided in an array. Typically, each frame will be in the form of a photographic image of a sheet of a document so that a single microfiche will contain the images of several pages of a book or several sheets from a file. Naturally, the images are much reduced in size and cannot be read by the naked eye for practical purposes. Thus, a microfiche reader has to be used to magnify the images and present them on a screen.

In the context of the decorative fiche referred to above, it will be desirable to produce a fiche which has easily readable characters such as letters (if appropriate) but more particularly to produce decorative patterns—such as a border. This can be done by having each frame contain part of a pattern, or one or more large letters or other combinations of readily visible elements.

In use, it is important that the various elements in adjacent frames, or where applicable a plurality of large elements in a single frame, be aligned properly. Any small errors will be magnified in appearance in the finished film, particularly if adjacent characters are at different angles. Where there is to be a continuation of a word over two adjacent frames, it is important that no unwanted gaps appear. This may also be desired in the case of decorative patterns. It is also important that no portions of a character are omitted by positioning them outside of the field of the camera. Thus, it is desirable to have a simple but reliable way of ensuring that the characters are correctly aligned and fully within the field.

It may be possible to design a number of complex systems for alignment but it is an object of another aspect of the invention to provide a system which requires little new hardware and is easy to set up. Accordingly, the method preferably involves the use of a strip, belt or the like which is set up to extend centrally across the field in alignment with the direction in which the camera shots follow eachother. The characters, such as letters or parts of a pattern, will be prefabricated and also provided with a matching strip on which they are mounted. By placing the character strip over the "permanent" strip and ensuring that the eges coincide, an operator can be sure that the characters are correctly aligned. Of course, this depends on the characters being properly aligned on their strip but this can be done at the time of fabrication by using squared paper or the like, or by having positive forms of locating the characters on their strip.

Where characters are to continue across two adjacent frames on the fiche, steps can be taken to ensure that there is no break in characters. This can be done by having two character strips of the same type during construction of the sequence of characters before photographing them. By abutting the two strips during such construction, the correct alignment of letters can be ensured and if necessary one part of a character can be on one strip and the other part on the next. Indeed, if a complete character is placed at one end of a strip but overlapping it, and the strip is if the correct length, then the overlapping part will not be photographed and this avoids the need to create parts of characters.

All of the strips should be black in a conventional microfilm system, and there must be a black background covering the entire field. Typically, the permanent strip could be secured to or integral with a backing sheet. Such a sheet would be securely fixed relative to the apparatus and would be left in place during normal microfilming of documents. Since the sheet will frequently be larger than the field, it may be provided with marks—in black so that they will not appear on the fiche—defining the field. Whilst the permanent strip could be marked graphically on a backing sheet, it is preferred that it be a physically defined item standing proud of the sheet. In this way, it is easier to align the character strip on it. Once in position, the character strip can be held temporarily during photography by means of adhesive tape or the like. For reasons of long life and for easy removal of adhesive tape, the strips are preferably of a plastics material. For ease of use, packaging and so forth, they may be flexible although they should resist stretching to avoid distortion.

Alignment of the permanent strip is important since, as noted above, small deviations from the ideal can result in very noticeable misalignments of characters on the final microfiche.

It will be appreciated that the above method enables e.g. a decorative pattern to be formed as a system of well aligned individual frames on the microfiche. Of course, in some circumstances it may be possible simply to have repeated identical frames to form a border.

An embodiment of the invention will now be described by way of example and with reference to the accompanying drawings in which.

Figure 1:
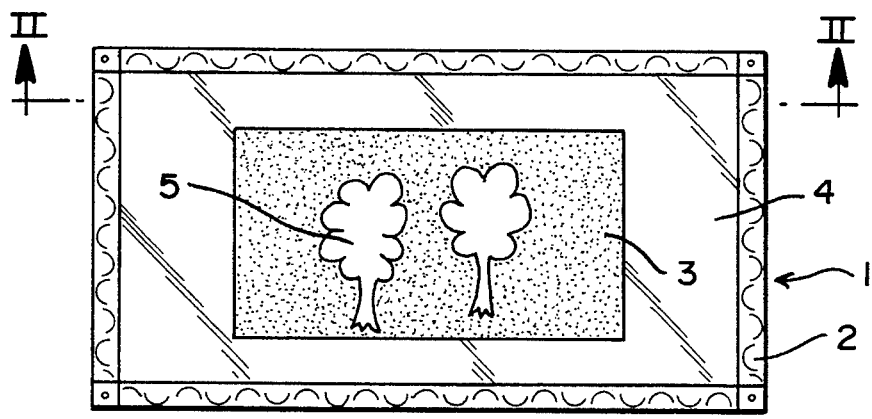
FIG. 1 is a plan view of a card.

The card 1 is in the form of a microfiche produced by a fiche duplicating machine. It has a decorative border 2 and a black main region 3, formed by the light sensitive material on the rear of the fiche. The border 2 is formed by frames from the microfiche technique decribed below. The intermediate region 4 is yellow and this is provided by dyeing the entire fiche 1 in a slowly simmering aqueous solution of dye material and pure water for ½ to 1 minute, thorough washing in cold water and allowing to dry. In some cases, an adhesive might be used to improve adhesion of the colouring material.

Before this dyeing, selected regions of a main image 5 can be painted. One part can be left clear—so as to be dyed yellow eventually—and other parts printed in any required colour. The paint will protect these areas from the dye.

Figure 2:
FIG. 2 is a section on the line II—II.

After painting and dyeing the rear surface of the fiche is covered with a sheet 6 of "sticky backed plastic"—ie. self-adhesive plastic sheet—which is cut to the size of the fiche. An edging 7 of clear adhesive tape is then applied around the entire periphery of the fiche. The construction can be seen in FIG. 2, where the light sensitive layer 8 forming the image is shown in an exaggerated thickness for explanatory purposes, applied to the basic clear sheet 9 forming the fiche. Other thicknesses are also exaggerated.

In another arrangement the microfiche is stuck onto a backing card .with a decorative border.

Protection is sought for the processes involved, both in terms of broad aspects and specific features alone or in combination, and for the cards and other items produced.

The invention is capable of application to items other than greeting or other decorative cards, such as posters, business cards, information sheets, and even books. It is also capable of mechanisation and to the use of specialists larger scale, machinery than conventional microfiche duplicating systems.

Many variations are possible as regards the cards. The decorative border may have a coloured tape—such as gold or silver—adhered to it so as to show through clear portions. For preferred effects, apart from in the selected areas the fiche should be clear, and any backing sheet of sticky plastic could be white. Any suitable dye could be used, such as natural dyes namely turmeric or saffron. The fiche may be adhered to a backing card of cardboard or stiff paper, and a "frame" effect may be provided, rather than using the technique of the edging 7. As regards producing the border, or e.g. letters or numerals on a card, reference will now be made to a preferred microfiche technique, as set forth in FIGS. 3 to 5. It will be appreciated that the drawings are diagrammatic and that there is no description of other parts of the system which are conventional, such as the camera, lighting arrangements, control systems and so forth.

Figure 3:
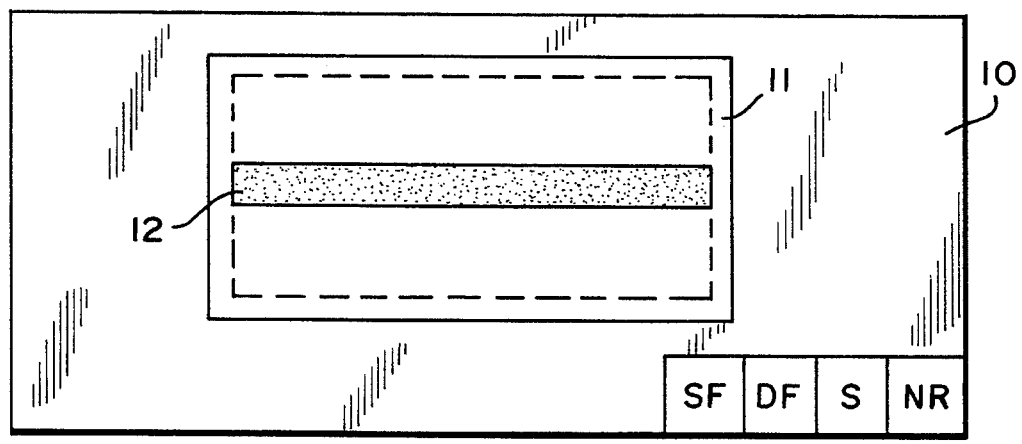
FIG. 3 is a plan view of the copy board region of a microfiche system, with a length of strip used to align the elements of a pattern in an embodiment of the invention.

Referring to FIG. 3, a copy board is indicated at 10. This is a flat level structure on which documents to be copied are placed. On this is marked at 11 the field within which images are captured by the camera of the system. Four conventional control switches are shown, namely "SF" for a single frame shot, "DE" for a double frame shot, "S" for a space and "NR" for a new row. With these the operator can create the fiche desired.

Across the field 11 extends a strip of black plastic 12 with parallel edges, whose ends correspond to the limits of the field of a microfilm camera, and which is parallel to the direction of frame advance.

Figure 4:
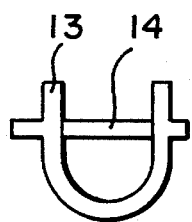
FIG. 4 shows an element to be photographed.
Figure 5:
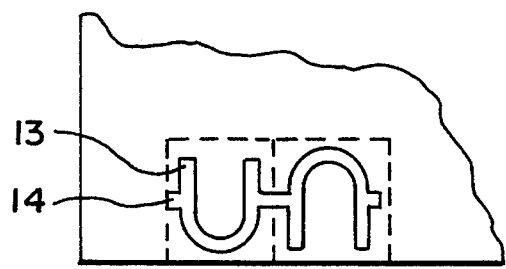
FIG. 5 shows two elements of a pattern in adjacent frames.

In FIG. 4 there is shown an element 13 of a pattern which is attached to its own strip 14 whose width is the same as that of the permanent strip 12. This is to be aligned on top of strip 12 to align the element in the frame and to ensure that the extremities of the element are at the edges of the frame. For the next frame the element can be inverted. The resultant fiche will be as shown in FIG. 5, with no gaps between the elements.

It will be appreciated that many variations are possible. Furthermore, protection is sought for all of the various aspects disclosed and discussed above both individually and in various combinations, as well as for uses in other contexts. Protection is sought for the methods, for the equipment used to carry them out whether complete or as kits, and for the microfilms produced.

Protection is sought for the decorative card and its manufacure as well as for the particular microfilming technique which is of use in many contexts where aligned characters are required—such as in labelling microfiches.

We claim:

1. A method of manufacturing a card bearing an image comprising the steps of:

a) providing an image;

b) transferring the image to an original microfiche having a plurality of discrete frames using a microfiche duplicating apparatus including a microfilm camera, wherein the image extends over a plurality of the discrete frames, by the steps of:

i) providing a master alignment strip on a copy board such that the master alignment strip extends across a field of the microfilm camera, the master alignment strip having opposite parallel sides bounding the width of the master alignment strip;

ii) providing each portion of the image to appear in a single frame of the original microfiche with an image alignment strip having a width equal to the width of the master alignment strip;

iii) aligning a portion of the image to appear in a single frame such that the image alignment strip is coincident with the master alignment strip;

iv) photographing the aligned portion of the image onto the original microfiche; and, v) repeating steps iii) and iv) until the entire image has been transferred to the original microfiche whereby the discrete frames cooperate to form the complete image;

c) transferring the image on the original microfiche to one side of a second microfiche which is to be viewed from an opposite side; and, d) affixing a protective layer on the one side so as to protect the transferred image.

2. A method as claimed in claim 1, wherein the master and image alignment strips are black and the image portions are light.

3. A method as claimed in claim 1, wherein the protective layer comprises a self-adhesive plastic sheet.

4. A method as claimed in claim 1 comprising the additional step of mounting the second microfiche on a backing card.

5. A method as claimed in claim 1 comprising the additional step of coloring portions of the second microfiche.

6. A method of manufacturing a card bearing a decorative image, comprising the steps of: transferring the decorative image to one side of a microfiche, which is to be viewed from the other side, wherein the decorative image is transferred to the microfiche by a microfiche duplicating apparatus from an original microfiche, and wherein the original microfiche has thereon a plurality of discrete frames, each frame containing a portion of the complete decorative image, and the frames, cooperate to form the complete image; and affixing a protective layer to said one side so as to protect the transferred image.

7. A method as claimed in claim 6, wherein image portions in adjacent frames are aligned by means of a system comprising a master strip having opposite parallel edges bounding the width of the master strip, the master strip extending across a field of a microfilm camera wherein, the image portions are provided with a matching strip having a width equal to the width of the master strip and are placed on the master strip with the edges of the master and matching strips aligned, for each frame shot by the microfilm camera.

8. A method as claimed in claim 7, wherein the master and matching strips are black and the image portions are light.

9. A method as claimed in claim 6, wherein the protective layer comprises a self adhesive plastic sheet.

10. A method as claimed in claim 6, comprising the additional step of mounting the microfiche on a backing card.

11. A method as claimed in claim 6, comprising the additional step of coloring portions of the microfiche.

* * * * *